US012710905B2

(12) United States Patent
Zhao et al.

(10) Patent No.: US 12,710,905 B2
(45) Date of Patent: Aug. 18, 2026

(54) IN-VEHICLE DISPLAY SCREEN, IN-VEHICLE DISPLAY SYSTEM AND VEHICLE

(71) Applicant: FAURECIA (CHINA) HOLDING CO., LTD., Shanghai (CN)

(72) Inventors: Wei Zhao, Shanghai (CN); Qingyang Su, Xiamen (CN); Linbing Ou, Shanghai (CN)

(73) Assignee: FAURECIA (CHINA) HOLDING CO., LTD., Shanghai (CN)

( * ) Notice: Subject to any disclaimer, the term of this patent is extended or adjusted under 35 U.S.C. 154(b) by 149 days.

(21) Appl. No.: 18/427,774

(22) Filed: Jan. 30, 2024

(65) Prior Publication Data

US 2024/0256201 A1 Aug. 1, 2024

(30) Foreign Application Priority Data

Jan. 30, 2023 (CN) ......................... 202310092348.7

(51) Int. Cl.
*G06F 3/14* (2006.01)
*B60K 35/10* (2024.01)
(Continued)

(52) U.S. Cl.
CPC ................ *G06F 3/14* (2013.01); *B60K 35/10* (2024.01); *B60K 35/53* (2024.01); *B60R 16/023* (2013.01);
(Continued)

(58) Field of Classification Search
CPC ...... G06F 3/14; G06F 3/04886; G06F 3/1423; G06F 3/1454; B60K 35/10; B60K 35/53; B60K 2360/1438; B60K 2360/164; B60K 2360/165; B60K 2360/589; B60K 2360/774; B60K 35/00; B60R 16/023; B60R 16/03; B60R 11/0229
See application file for complete search history.

(56) References Cited

U.S. PATENT DOCUMENTS 7,027,772 B2 * 4/2006 Chen ....................... H04L 63/10 455/404.1
12,431,023 B2 * 9/2025 Jordan ............... G06Q 30/0265
(Continued)

*Primary Examiner* — Richard M Camby
(74) *Attorney, Agent, or Firm* — Kilpatrick Townsend & Stockton LLP

(57) ABSTRACT

The present disclosure provides an in-vehicle display screen, an in-vehicle display system and a vehicle. The in-vehicle display screen is detachably mounted in one of multiple mounting positions of a vehicle and connected to the in-vehicle display system via a second position information interface, to obtain the position information from the second position information. In addition, the in-vehicle display system is configured in the vehicle, and is connected to at least one in-vehicle display screen via a second wireless communication module to determine a display content of the in-vehicle display screen, and sends video stream data of the content to the in-vehicle display screen via the second wireless communication module, to play the display content. By adopting the above, the present disclosure can flexibly arrange the number and position of in-vehicle display screens according to actual needs, to improve the user experience in terms of space, and reduce costs of the vehicle.

16 Claims, 7 Drawing Sheets

(51) Int. Cl.

*B60K 35/53* (2024.01)
*B60R 16/023* (2006.01)
*B60R 16/03* (2006.01)
*G06F 3/04886* (2022.01)

(52) U.S. Cl.

CPC .......... *B60R 16/03* (2013.01); *G06F 3/04886* (2013.01); *B60K 2360/1438* (2024.01); *B60K 2360/164* (2024.01); *B60K 2360/165* (2024.01); *B60K 2360/589* (2024.01); *B60K 2360/774* (2024.01)

(56) References Cited

U.S. PATENT DOCUMENTS

2005/0024356 A1* 2/2005 Lavelle ............ H04N 21/41422 345/204
2006/0047426 A1* 3/2006 Vitito ..................... B60K 35/22 701/469
2006/0070103 A1* 3/2006 Vitito .................. B60R 11/0211 725/77
2006/0238529 A1* 10/2006 Lavelle .................. B60N 2/879 345/204
2006/0282204 A1* 12/2006 Breed ................ G01G 23/3728 701/49

* cited by examiner

IN-VEHICLE DISPLAY SCREEN, IN-VEHICLE DISPLAY SYSTEM AND VEHICLE

FIELD

The present disclosure relates to in-vehicle infotainment technology, in particular to an in-vehicle display screen, an in-vehicle display system and a vehicle.

BACKGROUND

As users' demands for in-vehicle infotainment continue to increase, more and more car manufacturers are beginning to equip mid- to high-end vehicles with multiple-screen display functions for passengers in the front seat and rear seats to enjoy audio-visual, games and other entertainment, to kill some time while traveling. However, on one hand, mounting large number of in-vehicle display screens a will limit cockpit space for the users, and create a relatively strong sense of space pressure on the user and reduce the user experience in terms of space, on the other hand, it will greatly improve costs of in-vehicle display system and vehicle.

In order to overcome the defects of the existing solution, in-vehicle infotainment solution is urgently needed in the field, in order to flexibly arrange the number and position of in-vehicle display screens according to actual needs, to improve the user experience in terms of space, and reduce costs of vehicle.

SUMMARY

A brief overview of embodiments is provided below to provide a basic understanding of these aspects. The summary is not an exhaustive overview of all aspects envisaged, and is neither intended to identify the key or decisive elements of all aspects nor to attempt to define the scope of any or all aspects. The sole purpose of the summary is to present some concepts of one or more aspects in a simplified form as a prelude to the more detailed description that is presented later.

In order to overcome the defects of the existing technology, the present disclosure provides an in-vehicle display screen, an in-vehicle display system and a vehicle, being able to realize flexibly arranging the number and position of in-vehicle display screens according to actual needs, improving the user experience in terms of space, and reducing costs of vehicle.

The present disclosure provides an in-vehicle display screen being detachably mounted in one of multiple mounting positions of a vehicle according to embodiments of the disclosure. The in-vehicle display screen includes a first wireless communication module, and being connected to an in-vehicle display system via the first wireless communication module, and is configured to: obtain a position information indicating the mounting position; send the position information to the in-vehicle display system via the first wireless communication module, to provide the position information to the in-vehicle display system to determine a display content accordingly; and obtain the display content data from the in-vehicle display system via the first wireless communication module, and play the corresponding display content.

Further, in some embodiments of the present disclosure, the in-vehicle display screen further includes a first position information interface, and the first position information interface is connected to a second position information interface of the vehicle when the in-vehicle display screen is mounted in the mounting position, to obtain the position information from the second position information.

Further, in some embodiments of the present disclosure, each mounting position of the vehicle is provided with one second position information interface having a corresponding characteristic voltage, and each characteristic voltage has a different amplitude and/or waveform, to make the in-vehicle display screen determine the mounting position according to the characteristic voltage.

Further, in some embodiments of the present disclosure, the in-vehicle display screen further includes a human-machine interaction module, to obtain an input data provided by the user, to determine the position information indicating the mounting position.

Further, in some embodiments of the present disclosure, the human-machine interaction module is a touch module, and system interface of the in-vehicle display screen has a side-sliding window layer and is configured to: obtain and analyze a touch instruction provided by the user; response to the touch instruction to expand the side-sliding window layer, displaying icons indicating each mounting position in the side-pull window layer; and response to the touch instruction of clicking any of the icons, determining the mounting position according to the clicked icon.

In addition, an in-vehicle display system provided according to the second aspect of the present disclosure includes a second wireless communication module, is connected to at least one in-vehicle display screen via the second wireless communication module, and is configured to: obtain a position information indicating its mounting position from the in-vehicle display screen via the second wireless communication module, determine a display content of the in-vehicle display screen according to the position information; and send video stream data corresponding to the display content to the in-vehicle display screen to play the display content via the second wireless communication module.

Further, in some embodiments of the present disclosure, the in-vehicle display system further includes multiple mounting configurations, set at multiple mounting positions of the vehicle, and each mounting configuration is set with a second position information interface, and the second position information interface is connected to a first position information interface of the in-vehicle display screen when the in-vehicle display screen is mounted to the mounting configuration, and sends the position information indicating the corresponding mounting position to the first position information interface.

Further, in some embodiments of the present disclosure, each second position information interface has a corresponding characteristic voltage, and each characteristic voltage has a different amplitude and/or waveform, to indicate the mounting position of the in-vehicle display screen.

Further, in some embodiments of the present disclosure, the mounting position is selected from at least one of a center console, a driver's instrument panel, a passenger seat's instrument panel, and back side of a seat backrest, and the mounting position located at the mounting configuration of the center console, the driver's instrument panel and/or the passenger seat's instrument panel is further equipped with a charge interface, for charging the in-vehicle display screen mounted in the center console, the driver's instrument panel and/or the passenger seat's instrument panel.

Further, in some embodiments of the present disclosure, the in-vehicle display system is set with multiple virtual display screens, and each of the virtual display screens corresponds to one mounting position and is bound to at least one upper-layer application, steps of determining the display content of the in-vehicle display screen according to the position information include: determining the virtual display screen corresponding to its mounting position according to the position information; and determining the video stream data of a corresponding system interface, according to the upper-layer application bound to the virtual display screen.

Further, in some embodiments of the present disclosure, the upper-layer application bound to a first virtual display screen of a driver's instrument panel includes a vehicle information display application and a vehicle parameter adjustment application, and/or the upper-layer application bound to a second virtual display screen of a center console includes a vehicle information display application, a vehicle parameter adjustment application, and an in-vehicle infotainment application, and/or the upper-level application bound to a third virtual display on a passenger seat's instrument panel and/or back side of a seat backrest includes an in-vehicle infotainment application.

Further, in some embodiments of the present disclosure, after displaying the system interface, steps of determining the display content of the in-vehicle display screen according to the position information further include: obtaining a touch instruction provided by a user from the in-vehicle display screen via the second wireless communication module; and updating the display content of the corresponding virtual display screen according to the touch instruction.

In addition, a vehicle provided according to the third aspect of the present disclosure is equipped with the in-vehicle display system in the second aspect of the present disclosure.

DESCRIPTION OF ATTACHED DRAWINGS

The above embodiments of the present disclosure will be better understood after reading the detailed description of the embodiments of the present disclosure in conjunction with the following figures. In the figures, components are not necessarily drawn to scale, and components having similar related features may have the same or similar reference numerals.

Figure 1:
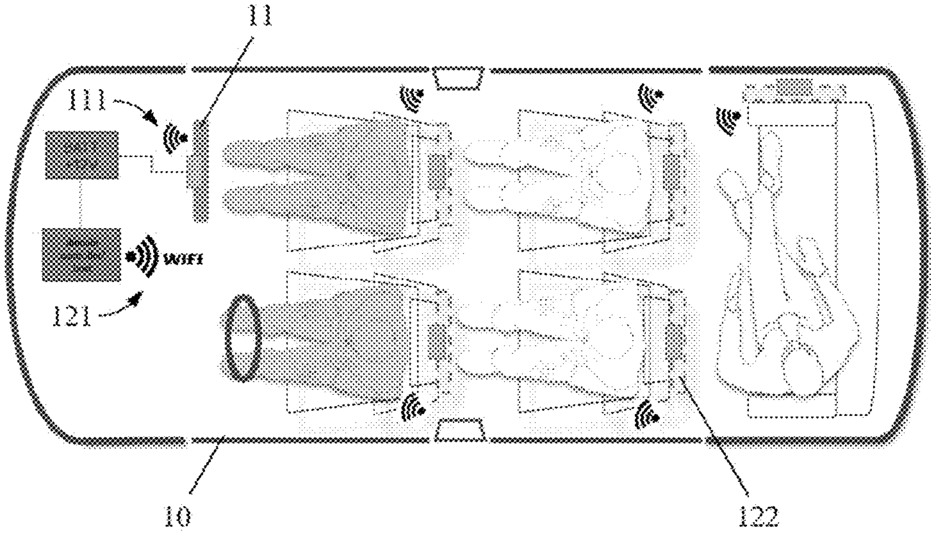
FIG. 1 shows an architectural diagram of a vehicle provided in accordance with some embodiments of the present disclosure.

| Reference number: | |
|---|---|
| 10 | vehicle |
| 11 | in-vehicle display screen |
| 111 | first wireless communication module |
| 12 | in-vehicle display system |
| 121 | second wireless communication module |
| 122 | mounting configuration |
| 31 | second position information interface |
| 41 | side-sliding window layer |
| 421, 422 | icons selected |
| 431, 432 | icons unselected |

DETAILED DESCRIPTION OF EMBODIMENTS

The implementations of the present disclosure are described below by specific embodiments. Embodiment of the present disclosure from the contents disclosed in the description. Although the description of the present disclosure is introduced together with other embodiments, it does not mean that the features of the present disclosure are limited to the embodiments. On the contrary, the purpose of introducing the present disclosure in combination with the embodiments is to cover other embodiments that may be extended based on the claims of the present disclosure. In order to provide a deep understanding of the present disclosure, the following description will contain many specific details. The present disclosure can also be implemented without using these details. In addition, in order to avoid confusion or ambiguity of the key points of the present disclosure, some specific details are omitted in the description.

In the description of the present disclosure, it should be noted that, unless otherwise specified and defined, the terms "installation", "connecting" and "connection" should be understood in a broad sense. For example, they can be fixed connection, removable connection or integrated connection; mechanical connection or electrical connection; as well as direct connection, indirect connection through intermediate media or internal connection of two components. The specific meaning of the above terms in the present disclosure can be understood in specific cases.

In addition, the words "up", "down", "left", "right", "top", "bottom", "horizontal" and "vertical" used in the following description should be understood as the orientation shown in this paragraph and the relevant drawings. This relative term is only for convenience of explanation, and does not mean that the described device needs to be manufactured or operated in a specific direction, so it should not be understood as a limitation of the present disclosure.

It is understood that although the terms "first", "second", "third", etc. can be used here to describe various components, regions, layers and/or parts, these components, regions, layers and/or parts should not be limited by these terms, and these terms are only used to distinguish different components, regions, layers and/or parts. Therefore, a first component, area, layer and/or part discussed below can be referred to as a second component, area, layer and/or part without departing from some embodiments of the present disclosure.

As mentioned above, as users' demands for in-vehicle infotainment continue to increase, more and more car manufacturers are beginning to equip mid- to high-end vehicles with multiple-screen display functions for passengers in the front seat and rear seats to enjoy audio-visual, games and other entertainment, to kill some time while traveling. However, on one hand, mounting large number of in-vehicle display screens a will limit cockpit space for the users, and create a relatively strong sense of space pressure on the user and reduce the user experience in terms of space, on the other hand, it will greatly improve costs of in-vehicle display system and vehicle.

However, statistically, in most use scenarios of vehicle, there is usually only one or two persons in the vehicle cockpit, and not everyone has the need to use the in-vehicle display screen at the same time. In order to overcome the defects of the existing technology, the present disclosure provides an in-vehicle display screen, an in-vehicle display system and a vehicle, being able to realize flexibly arranging the number and position of in-vehicle display screens according to actual needs, improving the user experience in terms of space, and reducing costs of vehicle.

In some non-limiting embodiments, the in-vehicle display screen provided by embodiments of the present disclosure can be implemented in conjunction with the in-vehicle display system provided by embodiments of the present disclosure. Specifically, the in-vehicle display system can be set in the in-vehicle infotainment system of the vehicle provided in embodiments of the present disclosure, and one or more in-vehicle display screens can be flexibly mounted at one or more mounting positions of the vehicle. The in-vehicle display system can conduct wireless data interaction with each in-vehicle display screen via a wireless communication module such as an in-vehicle WiFi module or an in-vehicle Bluetooth module, to share the in-vehicle display screen in multiple different areas of the vehicle, to reduce the number of display screens needed in the vehicle.

First, please refer to FIG. 1, which shows an architectural diagram of a vehicle provided in accordance with some embodiments of the present disclosure.

As shown in FIG. 1, the vehicle 10 provided according to embodiments of the present disclosure is equipped with the in-vehicle display system provided according to embodiments of the present disclosure, and is detachably mounted with one or more in-vehicle display screen 11 provided according to embodiments of the present disclosure. Here, each in-vehicle display screen 11 is detachably mounted in one of mounting positions from a center console, a driver's instrument panel, a passenger seat's instrument panel, and back side of the seat backrest of the vehicle 10, and a first wireless communication module 111 is set. A corresponding second wireless communication modules 121 are configured on a domain controller or host of the vehicle display system. The first wireless communication module 111 and the second wireless communication module 121 can be implemented based on wireless communication technologies such as WiFi, Bluetooth, and so on, and the in-vehicle display screen 11 can be connected to the second wireless communication module 121 of the vehicle display system via its first wireless communication module 111.

Figure 2:
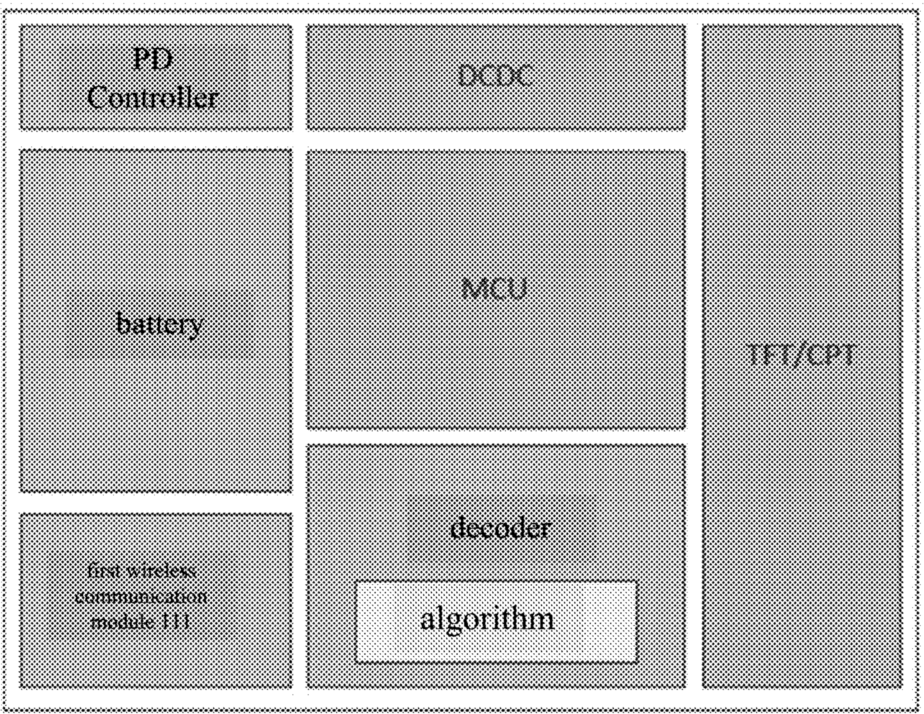
FIG. 2 shows a hardware architectural diagram of an in-vehicle display screen provided in accordance with some embodiments of the present disclosure.

Please refer specifically to FIG. 2, which shows hardware architectural diagram of the in-vehicle display screen 11 provided in accordance with some embodiments of the present disclosure.

As shown in FIG. 2, the hardware architecture of the in-vehicle display screen 11 includes an MCU (Microcontroller Unit), a decoder, a PD controller, a first wireless communication module 111, a DC/DC power management chip, a battery, and a TFT/CPT display. Here, MCU is mainly used to control the chip. The decoder is equipped with an algorithm, which is mainly used for decryption algorithm processing of wireless transmission data. The PD controller is mainly used for charge and discharge management of the battery. The first wireless communication module 111 is mainly used for wireless data transmission. The DC/DC power management chip is used for power management and voltage-up and voltage-down processing of the entire electronic architecture.

Further, in some embodiments, the vehicle 10 is provided with a mounting configuration 122 at multiple mounting positions from the center console, the driver's instrument panel, the passenger seat's instrument panel, and the backside of the seat backrest. The mounting configuration 122 includes but is not limited to various forms such as fix slots and suspension brackets, and is used to fixedly mounted the in-vehicle display screen 11 to the corresponding mounting position.

Furthermore, a charge interface is also provided in the mounting configuration located on the center console, the driver's instrument panel and/or the passenger seat's instrument panel. The charge interface can be connected to a 12V auxiliary DC power supply of the vehicle 10 and be used to charge the in-vehicle display 11 mounted on the center console, the driver's instrument panel and/or the passenger seat's instrument panel.

Figure 3:
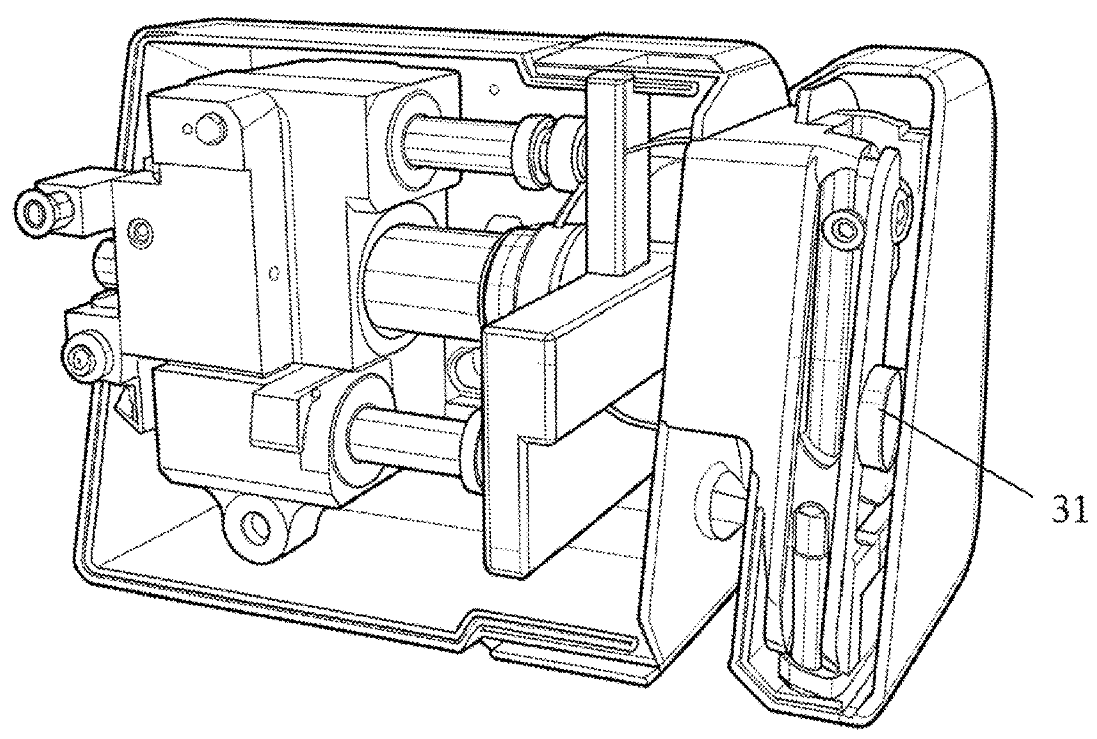
FIG. 3 shows a schematic diagram of a suspension bracket provided in accordance with some embodiments of the present disclosure.

In addition, please refer to FIG. 3, which shows a schematic diagram of the suspension bracket provided in accordance with some embodiments of the present disclosure.

As shown in FIG. 3, a second position information interface 31 in a form of a position signal pin or the like can be set on the mounting configuration 122. Correspondingly, the in-vehicle display screen 11 cab be set with a matched first position information interface. When the in-vehicle display screen 11 is mounting on the mounting configuration 122, the second position information interface 31 will be connected to the first position information interface of the in-vehicle display screen 11 and send a position information indicating the corresponding mounting location to the first position information interface. Here, each mounting position of the vehicle can be provided with a second position information interface 31 with a corresponding characteristic voltage. Further, for the in-vehicle display screen 11 to determine the mounting position according to the characteristic voltage, each characteristic voltage can have different amplitudes (for example: 1V, 3V, 5V) and/or waveforms (for example: square wave, Triangular wave, pulse wave, sine wave).

Specifically, when the in-vehicle display screen 11 is mounted at any one of the mounting positions of the vehicle 10, the second position information interface 31 provided at the mounting position can provide the characteristic voltage signal (for example: 1V DC voltage) indicating its position to the first position information interface of the in-vehicle display screen 11. The in-vehicle display screen 11 can make corresponding logical determinations based on the received voltage signal, and then send digital information indicating its mounting position to the second wireless communication module 121 of the vehicle display system via its own first wireless communication module 111. In response to receiving the digital information via the second wireless communication module 121, the domain controller of the vehicle display system can perform system configuration and layer updates according to a preset position window based on the received digital information.

The above embodiment of automatically obtaining position information through physical information interfaces such as the first position information interface and the second position information interface 31 is only one non-limiting implementations of the present disclosure, which is intended to clearly display the main idea of the present disclosure, and provide one specific solution that are convenient for the public to implement, rather than limiting the protection scope of the present disclosure.

Optionally, in some embodiments, the in-vehicle display screen 11 can also be set with a human-machine interaction module for obtaining an input data provided by a user, to determine a position information indicating the mounting position of the in-vehicle display screen 11.

Figure 4A:
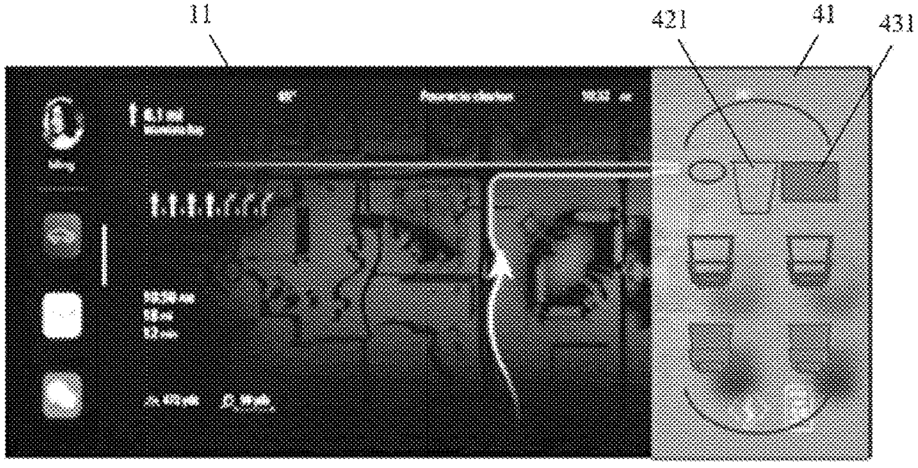
FIG. 4A and FIG. 4B show schematic diagrams of display interface of an in-vehicle display screen provided in accordance with some embodiments of the present disclosure.
Figure 4B:
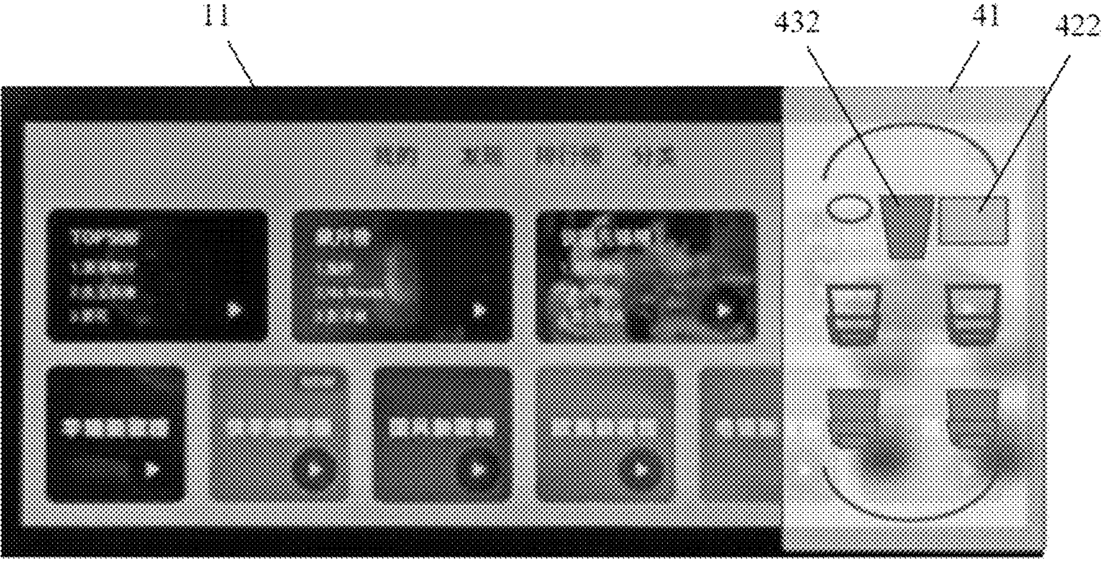

For details, please refer to FIG. 4A and FIG. 4B. FIG. 4A and FIG. 4B show schematic diagrams of a display interface of an in-vehicle display screen provided in accordance with some embodiments of the present disclosure.

As shown in FIG. 4A, the in-vehicle display screen 11 can be a touch screen, and its system interface has a side-sliding window layer. Correspondingly, the above-mentioned human-machine interaction module can be specifically a touch module. In the process of determining the position information through the human-machine interaction module, the user can perform a touch operation of sliding its finger to the right direction at the right edge of the in-vehicle display screen 11 to expand the side-sliding window layer 41, and then click on any icon therein (For example: center console icon 421) to select a mounting position of the in-vehicle display screen 11. The in-vehicle display screen 11 can obtain and analyze the touch instruction provided by the user through its touch module. In response to the touch instruction to expand the side-sliding window layer 41, the in-vehicle display screen 11 can adjust the coordinate position of the side-sliding window layer 41 and/or adjust transparency, etc., to display the side-sliding window layer 41 and the icons 421 and 431 therein indicating mounting position on its display interface. Further, in response to the user's touch instruction of clicking any icon 421, the in-vehicle display screen 11 can also determine its own mounting position according to the clicked icon 421, and send digital information to the second wireless communication module 121 of the in-vehicle display system via its first wireless communication module 111. In response to receiving the digital information via the second wireless communication module 121, the domain controller of the vehicle display system can perform system configuration and layer updates according to the preset position window based on the received digital information.

Afterwards, as shown in FIG. 4B, when the user changes seats and click to select another icon (for example, passenger seat icon 422), the in-vehicle display screen 11 can also reobtain and analyze the touch instruction provided by the user via its touch module. In response to the user's touch instruction of clicking any icon 421, the in-vehicle display screen 11 can also redetermine its mounting position according to the clicked icon 422, and send the digital information indicating its mounting position to the second wireless communication module 121 of the in-vehicle display system iva its first wireless communication module 111. In response to receiving the digital information via the second wireless communication module 121, the domain controller of the in-vehicle display system can update the system configuration and layer update according to the preset position window based on the received digital information.

The working principles of the above-mentioned in-vehicle display screen and in-vehicle display system will be described below with reference to some embodiments of control method of the in-vehicle display screen and the in-vehicle display system, and embodiments of the control method are only some non-limiting implementations of the present disclosure, which is intended to clearly display the main idea of the present disclosure, and provide some specific solutions that are convenient for the public to implement, rather than limiting all functions or all working modes of the in-vehicle display screen and the in-vehicle display system. Similarly, the in-vehicle display screen and the in-vehicle display system is only a non-limiting embodiment provided by the present disclosure, and does not limit the implementation subject to each step in the control method.

Figure 5:
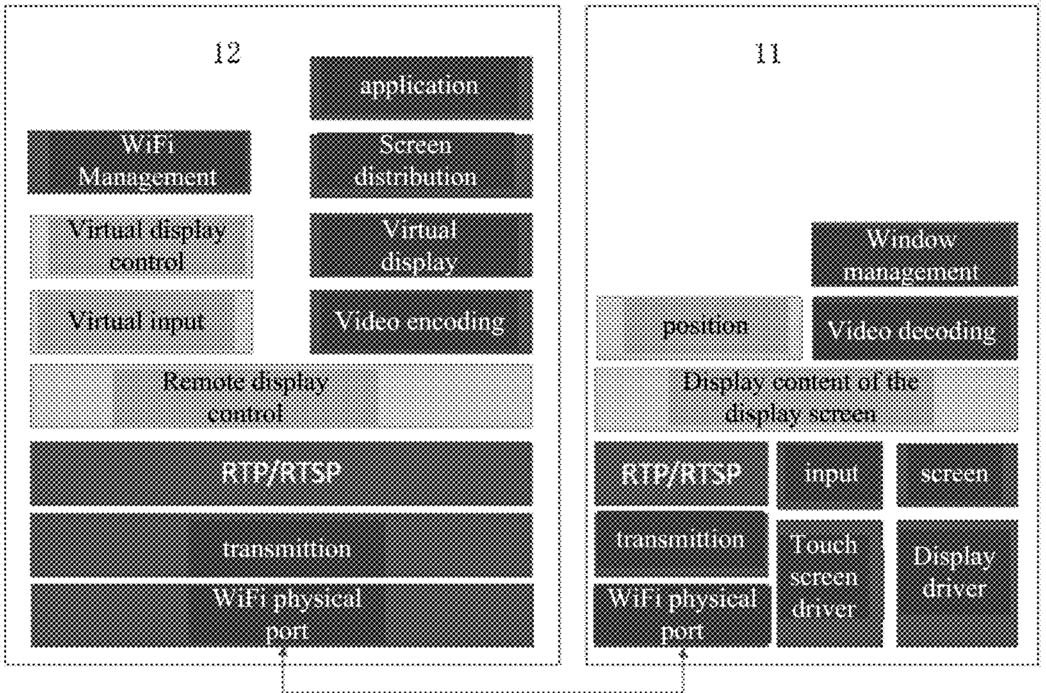
FIG. 5 shows an architectural diagram of an in-vehicle display screen and an in-vehicle display system provided in accordance with some embodiments of the present disclosure.
Figure 6:
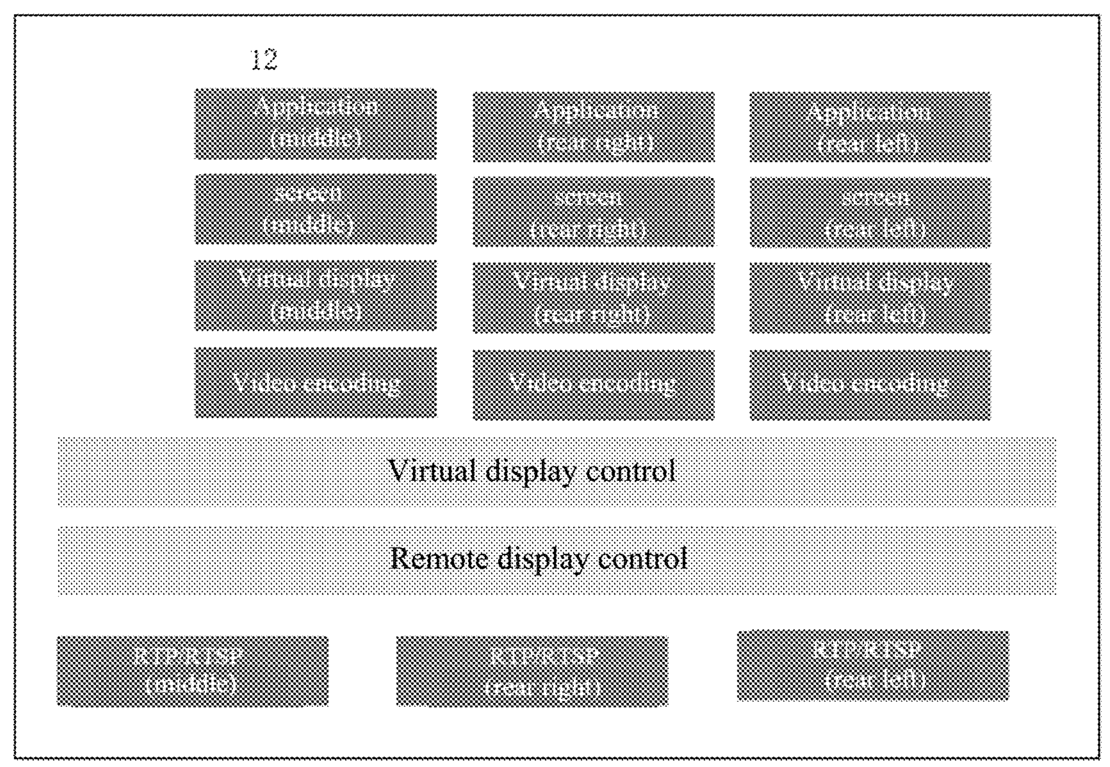
FIG. 6 shows a schematic diagram of virtual display in multiple screens and multiple applications provided in accordance with some embodiments of the present disclosure.
Figure 7:
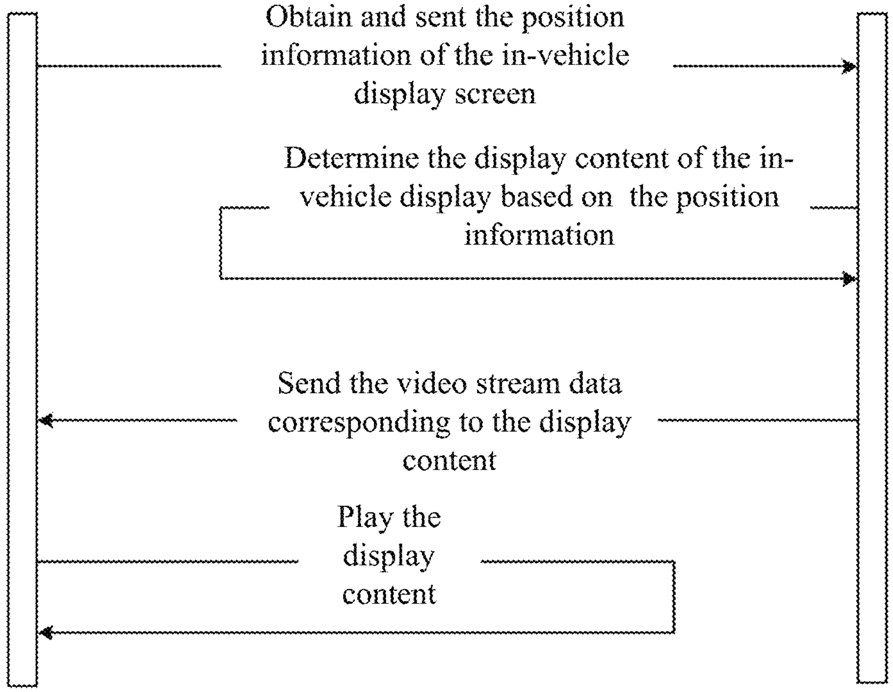
FIG. 7 shows a flow chart of sharing display method of an in-vehicle display screen provided in accordance with some embodiments of the present disclosure.

Please refer to FIGS. 5 to 7 in combination. FIG. 5 shows an architectural diagram of the in-vehicle display screen and the in-vehicle display system provided in accordance with some embodiments of the present disclosure. FIG. 6 shows a schematic diagram of virtual display in multiple screens and multiple applications provided in accordance with some embodiments of the present disclosure. FIG. 7 shows a flow chart of sharing display method of the in-vehicle display screen provided in accordance with some embodiments of the present disclosure.

As shown in FIGS. 5 to 7, the in-vehicle display system 12 can be implemented based on a smart cockpit domain controller (CDC), which is configured with a remote display control service and connects one or more in-vehicle displays 11 via a WiFi physical port, and obtains its position information from a position module of the in-vehicle display screen 11 via the second wireless communication module 121 and the first wireless communication module 111.

In addition, the in-vehicle infotainment (IVI) host of the in-vehicle display system 12 can virtualize virtual display screens at different positions through multiple virtual display modules. Here, each virtual display screen corresponds to one mounting position and is bound to at least one upper-layer application. Here, the upper-layer application bound to a first virtual display screen of the driver's instrument panel includes a vehicle information display application and a vehicle parameter adjustment application, and the driver can conveniently check and/or adjust vehicle parameter via the in-vehicle display screen 11 at the driver's instrument panel. The upper-layer application bound to a second virtual display screen of a center console includes a vehicle information display application, a vehicle parameter adjustment application, and an in-vehicle infotainment application, and the driver can conveniently check and/or adjust vehicle parameter, and enjoy audio-visual, games and other entertainment functions via the in-vehicle display screen 11 at the center console. The upper-level application bound to a third virtual display on the passenger seat's instrument panel and/or back side of a seat backrest includes an in-vehicle infotainment application, and the users from front and rear seats can enjoy audio-visual, games and other entertainment functions via the in-vehicle display screen 11 at the passenger seat's instrument panel and/or back side of a seat backrest, to avoid unauthorized access to the private data of the vehicle 10, or unauthorized adjustment of the vehicle driving parameters and/or vehicle safety parameters of the vehicle 10.

In response to obtaining the position information of each in-vehicle display screen 11 from the remote display control module, virtual display control module can determine the virtual display screen corresponding to its mounting position based on the position information, and then determine the video stream data of the corresponding system interface based on the upper-layer application bound to each virtual display screen, and control different virtual display modules to output the video stream data to the corresponding in-vehicle display screen 11 via the second wireless communication module 31.

In addition, the in-vehicle display screen 11 can also obtain the touch instruction provided by the user through its input module, and send the touch instruction to the in-vehicle display system 12 via the first wireless communication module 111 and the second wireless communication module 121. In response to obtaining the touch instruction provided by the user from the in-vehicle display screen 11, the vehicle-mounted display system 12 can also update the display content of the corresponding virtual display screen according to the touch instruction. Specifically, the in-vehicle display system 12 can virtualize multiple different virtual display screens, bind them to the upper-layer application respectively, and then define different RTP/RTSP communications to different in-vehicle display screens 11 based on the position information provided by the in-vehicle display screen 11. The position information can be changed according to the movement of the in-vehicle display screen 11. The virtual input module can obtain touch screen information from the remote display control module, virtualize it into event information corresponding to different screens and send it to the upper-layer application, and send the corresponding display data to different in-vehicle display screens through corresponding channels by the virtual display control module. Through such settings, when the in-vehicle display screen 11 moves among different positions, it can be dynamically switched and updated to the application information of the corresponding position.

Afterwards, in response to receiving the display data corresponding to the current position from the in-vehicle display system 12, the display module of the in-vehicle display screen 11 can decode it via a video decoding module and send it to the screen for displaying via a display driving module.

In summary, the present disclosure provides an in-vehicle display screen, an in-vehicle display system and a vehicle, being able to realize flexibly arranging the number and position of in-vehicle display screens according to actual needs, improving the user experience in terms of space, and reducing costs of vehicle.

Although the above methods are illustrated and described as a series of actions in order to simplify the explanation, it should be understood and appreciated that these methods are not limited by the order of actions, because according to one or more embodiments, some actions can occur in different order and/or concurrently with other actions from the illustrations and descriptions herein or not illustrated and described herein.

In some embodiments, signals and data can be represented using any of a variety of different technologies and techniques. For example, the data, instructions, commands, information, signals, bits, symbols and chips cited throughout the above description may be represented by voltage, current, electromagnetic waves, magnetic fields or magnetic particles, optical fields or optical particles, or any combination thereof.

In some embodiments, various illustrative logic blocks, modules, circuits, and algorithm steps described in the embodiments disclosed herein can be implemented as electronic hardware, computer software, or a combination of both. In order to clearly explain the interchangeability of hardware and software, various illustrative components, blocks, modules, circuits, and steps are generally described above in the form of their functionality. Whether such functionality is implemented as hardware or software depends on the specific application and design constraints imposed on the overall system. Technicians can implement the described functionality in different ways for each specific application, but such implementation decisions should not be regarded as leading to departure from the scope of the disclosure.

The previous description of the disclosure is provided to enable understanding of the disclosure. Various modifications to the disclosure will be apparent, and the universal principles defined herein can be applied to other variants without departing from the spirit or scope of the disclosure. Therefore, this disclosure is not intended to be limited to the examples and designs described herein, but should be granted the widest scope consistent with the principles and novel features disclosed herein.

What is claimed is:

1. An in-vehicle display screen, being detachably mounted in one of multiple mounting positions of a vehicle, comprising a first wireless communication module, and being connected to an in-vehicle display system via the first wireless communication module, and being configured to:

obtain a position information indicating the mounting position;

send the position information to the in-vehicle display system via the first wireless communication module, to provide the position information to the in-vehicle display system to determine a display content accordingly; and obtain the display content data from the in-vehicle display system via the first wireless communication module, and play the corresponding display content;

the in-vehicle display screen further comprises:

a first position information interface, wherein the first position information interface is connected to a second position information interface of the vehicle when the in-vehicle display screen is mounted in the mounting position, to obtain the position information from the second position information.

2. The in-vehicle display screen according to claim 1, wherein each mounting position of the vehicle is provided with one second position information interface having a corresponding characteristic voltage, wherein each characteristic voltage has a different amplitude and/or waveform, to make the in-vehicle display screen determine the mounting position according to the characteristic voltage.

3. The in-vehicle display screen according to claim 1, wherein it further comprises:

a human-machine interaction module, to obtain an input data provided by a user, to determine the position information indicating the mounting position.

4. The in-vehicle display screen according to claim 3, wherein the human-machine interaction module is a touch module, and system interface of the in-vehicle display screen has a side-sliding window layer and is configured to:

obtain and analyze a touch instruction provided by the user;

response to the touch instruction to expand the side-sliding window layer, displaying icons indicating each mounting position in a side-pull window layer; and response to the touch instruction of clicking any of the icons, determining the mounting position according to the clicked icon.

5. An in-vehicle display system, comprising a second wireless communication module, being connected to at least one in-vehicle display screen via the second wireless communication module, and being configured to:

obtain a position information indicating its mounting position from the in-vehicle display screen via the second wireless communication module, determine a display content of the in-vehicle display screen according to the position information; and send video stream data corresponding to the display content to the in-vehicle display screen to play the display content via the second wireless communication module;

the in-vehicle display system further comprises:

multiple mounting configurations, set at multiple mounting positions of the vehicle, wherein each mounting configuration is set with a second position information interface, and the second position information interface is connected to a first position information interface of the in-vehicle display screen when the in-vehicle display screen is mounted to the mounting configuration, and sends the position information indicating the corresponding mounting position to the first position information interface.

6. The in-vehicle display system according to claim 5, wherein each second position information interface has a corresponding characteristic voltage, wherein each characteristic voltage has a different amplitude and/or waveform, to indicate the mounting position of the in-vehicle display screen.

7. The in-vehicle display system according to claim 5, wherein the mounting position is selected from at least one of a center console, a driver's instrument panel, a passenger seat's instrument panel, and back side of a seat backrest, wherein the mounting position located at the mounting configuration of the center console, the driver's instrument panel and/or the passenger seat's instrument panel is further equipped with a charge interface, for charging the in-vehicle display screen mounted in the center console, the driver's instrument panel and/or the passenger seat's instrument panel.

8. The in-vehicle display system according to claim 5, wherein the in-vehicle display system is set with multiple virtual display screens, wherein each of the virtual display screens corresponds to one mounting position and is bound to at least one upper-layer application, steps of determining the display content of the in-vehicle display screen according to the position information comprise:

determining the virtual display screen corresponding to its mounting position according to the position information; and determining the video stream data of a corresponding system interface, according to the upper-layer application bound to the virtual display screen.

9. The in-vehicle display system according to claim 8, wherein the upper-layer application bound to a first virtual display screen of a driver's instrument panel comprises a vehicle information display application and a vehicle parameter adjustment application, and/or the upper-layer application bound to a second virtual display screen of a center console comprises a vehicle information display application, a vehicle parameter adjustment application, and an in-vehicle infotainment application, and/or an upper-level application bound to a third virtual display on a passenger seat's instrument panel and/or back side of a seat backrest comprises an in-vehicle infotainment application.

10. The in-vehicle display system according to claim 8, wherein after displaying the system interface, steps of determining the display content of the in-vehicle display screen according to the position information further comprise:

obtaining a touch instruction provided by a user from the in-vehicle display screen via the second wireless communication module; and updating the display content of the corresponding virtual display screen according to the touch instruction.

11. A vehicle, being equipped with an in-vehicle display system, wherein the in-vehicle display system comprises a second wireless communication module, being connected to at least one in-vehicle display screen via the second wireless communication module, and being configured to:

obtain a position information indicating its mounting position from the in-vehicle display screen via the second wireless communication module, determine a display content of the in-vehicle display screen according to the position information; and send video stream data corresponding to the display content to the in-vehicle display screen to play the display content via the second wireless communication module;

the in-vehicle display system further comprises:

multiple mounting configurations, set at multiple mounting positions of the vehicle, wherein each mounting configuration is set with a second position information interface, and the second position information interface is connected to a first position information interface of the in-vehicle display screen when the in-vehicle display screen is mounted to the mounting configuration, and sends the position information indicating the corresponding mounting position to the first position information interface.

12. The vehicle according to claim 11, wherein each second position information interface has a corresponding characteristic voltage, wherein each characteristic voltage has a different amplitude and/or waveform, to indicate the mounting position of the in-vehicle display screen.

13. The vehicle according to claim 11, wherein the mounting position is selected from at least one of a center console, a driver's instrument panel, a passenger seat's instrument panel, and back side of a seat backrest, wherein the mounting position located at the mounting configuration of the center console, the driver's instrument panel and/or the passenger seat's instrument panel is further equipped with a charge interface, for charging the in-vehicle display screen mounted in the center console, the driver's instrument panel and/or the passenger seat's instrument panel.

14. The vehicle according to claim 11, wherein the in-vehicle display system is set with multiple virtual display screens, wherein each of the virtual display screens corresponds to one mounting position and is bound to at least one upper-layer application, steps of determining the display content of the in-vehicle display screen according to the position information comprise:

determining the virtual display screen corresponding to its mounting position according to the position information; and determining the video stream data of a corresponding system interface, according to the upper-layer application bound to the virtual display screen.

15. The vehicle according to claim 14, wherein the upper-layer application bound to a first virtual display screen of a driver's instrument panel comprises a vehicle information display application and a vehicle parameter adjustment application, and/or the upper-layer application bound to a second virtual display screen of a center console comprises a vehicle information display application, a vehicle parameter adjustment application, and an in-vehicle infotainment application, and/or the upper-level application bound to a third virtual display on a passenger seat's instrument panel and/or back side of a seat backrest comprises an in-vehicle infotainment application.

16. The vehicle according to claim 14, wherein after displaying the system interface, steps of determining the display content of the in-vehicle display screen according to the position information further comprise:

obtaining a touch instruction provided by a user from the in-vehicle display screen via the second wireless communication module; and updating the display content of the corresponding virtual display screen according to the touch instruction.

* * * * *